US009760560B2

(12) United States Patent
Corston et al.

(10) Patent No.: US 9,760,560 B2
(45) Date of Patent: Sep. 12, 2017

(54) CORRECTION OF PREVIOUS WORDS AND OTHER USER TEXT INPUT ERRORS

(71) Applicant: Nuance Communications, Inc., Burlington, MA (US)

(72) Inventors: Simon Corston, New Westminster (CA); Ethan R. Bradford, Seattle, WA (US); Donni McCray, Seattle, WA (US); Erland Unruh, Seattle, WA (US); Claes-Fredrik Mannby, Seattle, WA (US); David J. Kay, Seattle, WA (US); Keith Trnka, Seattle, WA (US)

(73) Assignee: NUANCE COMMUNICATIONS, INC., Burlington, MA (US)

(*) Notice: Subject to any disclaimer, the term of this patent is extended or adjusted under 35 U.S.C. 154(b) by 46 days.

(21) Appl. No.: 14/663,368

(22) Filed: Mar. 19, 2015

(65) Prior Publication Data

US 2016/0275070 A1  Sep. 22, 2016

(51) Int. Cl.
- *G06F 17/27* (2006.01)
- *G06F 3/0484* (2013.01)
- *G06F 3/023* (2006.01)
- *G06F 3/0488* (2013.01)

(52) U.S. Cl.
CPC .......... *G06F 17/277* (2013.01); *G06F 3/0236* (2013.01); *G06F 3/0237* (2013.01); *G06F 3/04886* (2013.01); *G06F 17/274* (2013.01); *G06F 17/2715* (2013.01)

(58) Field of Classification Search
CPC .. G06F 17/277; G06F 3/04842; G06F 17/274; G06F 17/2715

USPC .............................................. 704/9
See application file for complete search history.

(56) References Cited

U.S. PATENT DOCUMENTS

| 6,618,697 | B1* | 9/2003 | Kantrowitz | G06F 17/273 703/2 |
| 7,129,932 | B1* | 10/2006 | Klarlund | G06F 3/0237 341/22 |
| 2005/0165598 | A1* | 7/2005 | Cote | G10L 15/183 704/1 |
| 2006/0241944 | A1* | 10/2006 | Potter | G06F 17/2795 704/254 |
| 2006/0293889 | A1* | 12/2006 | Kiss | G10L 15/22 704/235 |

(Continued)

*Primary Examiner* — Edwin S Leland, III
(74) *Attorney, Agent, or Firm* — Perkins Coie LLP

(57) ABSTRACT

The disclosed system provides an efficient method of using a later word or words entered after a previous word along with one or more language models that show which words are likely to occur together to identify a better disambiguated choice for the previous word. To identify the better disambiguated choice for the previous word, the system can evaluate the conditional probability for the later word of various candidate previous words, and select the candidate previous word that has the highest conditional probability. If the conditional probability of the selected candidate previous word exceeds that of the previous word that was entered by at least a factor, then the system can include the selected candidate previous word in a selection list for user selection. The disclosed system also provides an efficient method for using one or more language models and a later word to correct errors in segmenting the word.

18 Claims, 11 Drawing Sheets

(56) References Cited

U.S. PATENT DOCUMENTS

| | | | | |
|---|---|---|---|---|
| 2009/0058823 | A1* | 3/2009 | Kocienda | G06F 3/0236 |
| | | | | 345/173 |
| 2009/0313017 | A1* | 12/2009 | Nakazawa | G06F 17/2715 |
| | | | | 704/244 |
| 2010/0325539 | A1* | 12/2010 | Nedzlek | G06F 17/30011 |
| | | | | 715/257 |
| 2011/0060984 | A1* | 3/2011 | Lee | G06F 17/276 |
| | | | | 715/261 |
| 2011/0167340 | A1* | 7/2011 | Moore | G06F 3/0233 |
| | | | | 715/257 |
| 2013/0332822 | A1* | 12/2013 | Willmore | G06F 17/273 |
| | | | | 715/257 |
| 2014/0012567 | A1* | 1/2014 | Caskey | G06F 17/273 |
| | | | | 704/9 |
| 2014/0108992 | A1* | 4/2014 | Bi | G06F 17/276 |
| | | | | 715/773 |
| 2014/0344680 | A1* | 11/2014 | Kim | G06F 17/273 |
| | | | | 715/271 |
| 2015/0134642 | A1* | 5/2015 | Chomley | G06F 3/04886 |
| | | | | 707/722 |
| 2015/0309984 | A1* | 10/2015 | Bradford | G06F 17/2863 |
| | | | | 704/8 |
| 2015/0347383 | A1* | 12/2015 | Willmore | G06F 17/276 |
| | | | | 704/9 |
| 2015/0355727 | A1* | 12/2015 | Hu | G06F 3/04886 |
| | | | | 345/169 |
| 2016/0275070 | A1* | 9/2016 | Corston | G06F 3/0236 |

* cited by examiner

CORRECTION OF PREVIOUS WORDS AND OTHER USER TEXT INPUT ERRORS

BACKGROUND

Text-based messaging (e.g., texting, emailing, instant messaging) is commonly used by mobile device users to communicate with each other. However, the small form factor of mobile devices can contribute to slower rate of text input by users and increased frequency of text input errors. To increase the reliability and efficiency of text input, many applications provide a correction feature to correct for text input errors. Conventional correction systems typically rely on table lookups to correct for text input errors. However, building a table for this purpose requires a high level of linguistic expertise to assert which combination of words would not occur together, and thus should be corrected to something else.

For example, consider the phrase "to much." A conventional correction system relying on a lookup table may be able to automatically correct "to much" to "too much." However, such a correction is not always appropriate. For example, the phrase "to much" in the context of the phrase, "she gave the performance to much acclaim" would not need to be corrected. Thus, conventional correction systems based on lookup tables often end up making wrong "corrections," which can lead to user frustration and additional delay in inputting text as a user attempts to manually correct the inappropriate" corrections.

DETAILED DESCRIPTION

Figure 1A:
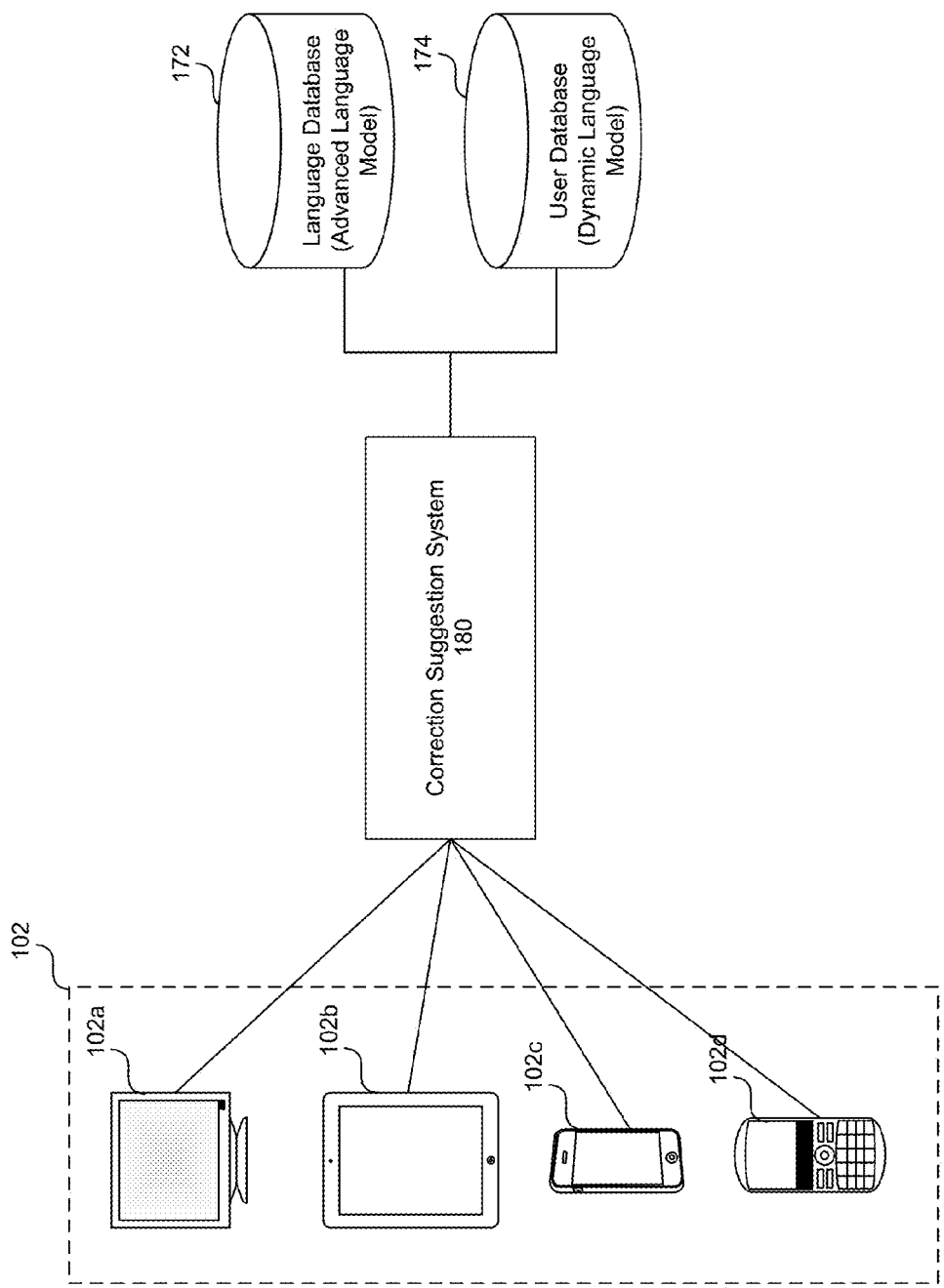
FIG. 1A is a block diagram illustrating an example of an environment in which a correction suggestion system can operate.

A correction suggestion system that suggests a correction for a previously input word or phrase and/or ambiguity in text input (particularly though not necessarily on a mobile device) is disclosed. In some embodiments, the correction suggestion system employs a probabilistic algorithm that takes into account the context and language model probabilities to suggest different possibilities for a preceding word or words when triggered by a subsequent word. For example, a text input "il" is generally corrected to "I'll" by default. When "il" is followed by "will" to form the input words "il will," the correction suggestion system recognizes that "ill" is much more likely to be the word the user intended to input and thus provides "ill" as a "back correction" to correct "il will" to "ill will." As used herein, a back correction refers to a correction for a word or words preceding a current word. In other words, one or more than one word back from the current word can be corrected through back correction.

The probabilistic algorithm suggests back corrections based on the same language model probabilities that are used to predict next word or words given a previous word or words. By re-using the same language model probabilities, the probabilistic algorithm can provide immediate feedback on wrong previous words in an efficient manner, without imposing a large burden on computation, memory, power and other resources of computing devices. For example, there is no need to create a separate table or database of probabilities, which means computation resources to generate the separate table and storage space needed to store the separate table are saved, This is particularly advantageous for those computing devices (e.g., mobile devices) that have limited resources. Moreover, as the probabilistic algorithm takes into account the overall context of text input, the correction suggestion system can suggest suitable corrections in many more instances than possible by conventional correction systems.

In some embodiments, the correction suggestion system also detects ambiguities in mobile text input as a user attempts to tap or press keys from a mobile device keypad (e.g., a touch keypad, a physical keypad on a mobile device, a remote control, etc.) that not only has a small surface area, but can also have multiple letters on a same key. For example, some French keypads have the letters "e" and "q" on the same key. So, even if the user correctly presses a key, there is still some ambiguity as to which letter of the key the user intended to press. Similarly, errors such as pressing a space key instead of a letter key, transposing a space key with a letter key, and mishitting a backspace/delete key or shift key become more likely during mobile text input because of the reduced area of keypads on mobile devices. In some embodiments, the correction suggestion system can suggest corrections for such text input errors by allocating keys differently to the previous word based on the context of the current word. For example, in the case of the user input "ta le," the correction suggestion system can interpret the ambiguous space as a mishit and the user may have intended to press the letter "b" which is located close to the space key on a keypad. The correction suggestion system can thus recommend a single word "table" for back correction. In the case of a space transposition error, the correction suggestion system can segment the previous word and the current word multiple ways to find a replacement for both the previous and current words. Similarly, the correction suggestion system can interpret punctuation and function key presses as being ambiguous key presses and recommend suggestions for back correction that match the key press sequence and the ambiguous function or punctuation key press.

Without limiting the scope of this detailed description, examples of the correction suggestion system and associated apparatus, methods, and related results according to the embodiments of the present disclosure are given below. Unless otherwise defined, all technical and scientific terms used herein have the same meaning as commonly understood by one of ordinary skill in the art to which this disclosure pertains. In the case of conflict, the present document, including definitions, will control. The terms used in this detailed description generally have their ordinary meanings in the art, within the context of the disclosure, and in the specific context where each term is used. For convenience, certain terms may be emphasized, for example using italics and/or quotation marks. The use of emphasis has no influence on the scope and meaning of a term; the scope and meaning of a term is the same, in the same context, whether or not it is emphasized. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

1. Suitable Environment

FIG. 1A is a block diagram illustrating an example of an environment in which the correction suggestion system can operate. The illustrated environment includes a computing device 102, which can be a personal computer, a smart or network connected television or set-top box 102a, a tablet device 102b, a mobile device or phone (e.g., a handheld or laptop device, a touch screen mobile device 102c, a mobile device or phone with a physical keyboard 102d), or any other programmable consumer electronic device having input and output interfaces. The computing device 102 can implement the correction suggestion system 180 to receive and analyze at least two words from a user and suggest one or more alternative words for back correction. For example, in some cases, the correction suggestion system can suggest a replacement for a previous word or phrase, a replacement for a current word or phrase, replacements for both the previous and current words or phrases, or a single replacement for the previous and current words or phrases using the methods disclosed herein.

In some embodiments, the correction suggestion system 180 makes a suggestion for back correction based on an advanced language model (n-gram language model) and/or a dynamic language model. In some embodiments, the advanced language model can be built based on frequency of the combinations. That is, the model can represent for certain ordered combinations of n words (e.g., two words, three words), the probability of a specific next word following those n-words. The system relies on a language model based on n-grams, which can include, for example, bigrams (n=2), trigrams (n=3) and so on. In some embodiments, the language database 172 can store n-grams along with corresponding probabilities for the next words. For example, the n-gram "The planet" may be associated with single words and probabilities like Earth 60%; Mars 30%; Mercury 5%; etc., and/or three word combinations in order of probability (e.g., The planet Earth 60%; The planet Mars 30%). In an implementation, the language database 172 can be stored in a second memory (not shown) communicatively coupled to the computing device 102. Typically the language database 172 is stored locally and it may only include n-grams having a high frequency of occurrence and next words having a high probability (e.g., next words having a probability that exceeds 25%). In some embodiments, the language database 172 can be stored remotely and accessed over a communication network. In some embodiments, the language database 172 can be periodically updated with words and probabilities from a remote server (not shown) based on news events (e.g., a discovery on Mercury could temporarily raise the probability of Mercury to greater than Mars), changes in the language (e.g., as new words enter the lexicon), and/or other reasons. The dynamic language model takes into account user preferences and/or usage to predict the next word or words. The dynamic language model words can be stored in a separate user database 174. In some embodiments, the correction suggestion system 180 can select a specific type of language model for use in generating its predictions. The selection of a specific type of language model may depend on a particular context, for example, an application that a user is using, a location of the user's device, or the like.

Figure 1B:
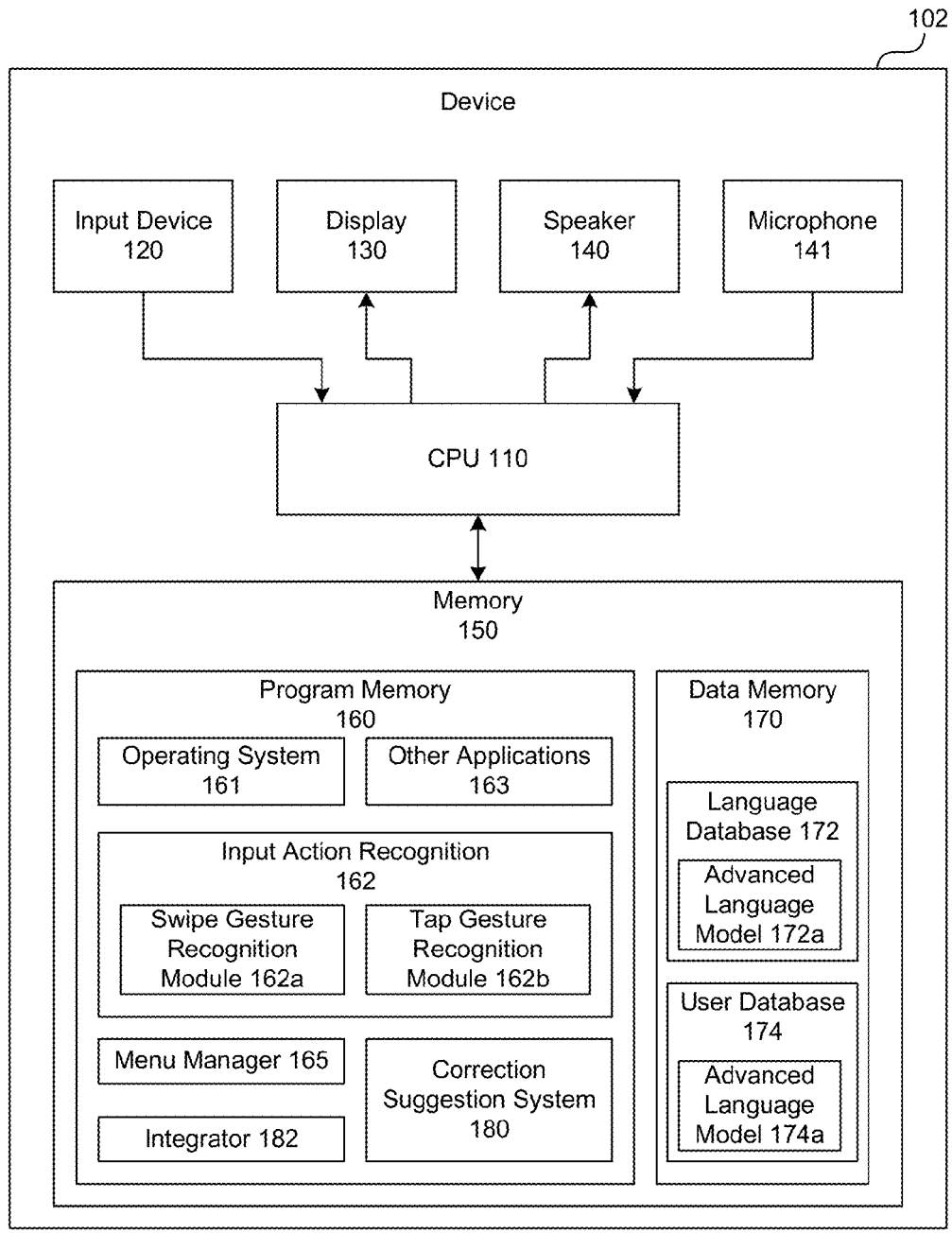
FIG. 1B is a block diagram illustrating components of a computing device implementing the correction suggestion system.

FIG. 1B is a block diagram illustrating components of a computing device 102 implementing the correction suggestion system 180. The computing device 102 includes one or more input devices 120 that provide input to the CPU (processor) 110, notifying it of actions performed by a user, such as a tap or gesture. The actions are typically mediated by a hardware controller that interprets the signals received from the input device and communicates the information to the CPU 110 using a known communication protocol. Input devices 120 can include, for example, a capacitive touchscreen, a resistive touchscreen, a surface wave touchscreen, a surface capacitance touchscreen, a projected touchscreen, a mutual capacitance touchscreen, a self-capacitance sensor, an infrared touchscreen, an infrared acrylic projection touchscreen, an optical imaging touchscreen, a touchpad that uses capacitive sensing or conductance sensing, or the like. Other input devices that may employ the present system include wearable input devices with accelerometers (e.g. wearable glove-type input devices), a camera- or image-based input device to receive images of manual user input gestures, remote control handsets (e.g., based on Bluetooth, Infrared, and/or other wireless technologies), and so forth.

The CPU 110 may be a single processing unit or multiple processing units in the computing device 102 or distributed across multiple devices. Similarly, the CPU 110 communicates with a hardware controller for a display 130 on which text and graphics are displayed. One example of a display 130 is a display of the touchscreen that provides graphical and textual visual feedback to a user. In some implementations, the display includes the input device 120 as part of the display, such as when the input device is a touchscreen. In some implementations, the display 130 is separate from the input device 120. For example, a touchpad (or trackpad) may be used as the input device 120, and a separate or standalone display device that is distinct from the input device 120 may be used as the display 130. Examples of standalone display devices are: an LCD display screen, an LED display screen, a projected display (such as a heads-up display device), a television, and so on. Optionally, a speaker 140 is also coupled to the CPU 110 so that any appropriate auditory signals can be passed on to the user. For example, the computing device 102 may generate audio corresponding to a selected word. In some implementations, the computing device 102 includes a microphone 141 that is also coupled to the CPU 110 so that spoken input can be received from the user.

The CPU or processor 110 has access to a memory 150, which may include a combination of temporary and/or permanent storage, and both read-only and writable memory (random access memory or RAM), read-only memory (ROM), writable nonvolatile memory, such as flash memory, hard drives, floppy disks, and so forth. The memory 150 includes program memory 160 that contains all programs and software, such as an operating system 161, input action recognition software 162, and any other application programs 163. The input action recognition software 162 may include input gesture recognition components, such as a swipe gesture recognition portion 162a and a tap gesture recognition portion 162b, though other input components are of course possible. The input action recognition software may include data related to one or more enabled character sets, including character templates (for one or more languages), and software for matching received input with character templates and for performing other functions as described herein. The program memory 160 also includes the correction suggestion system 180 which is described in detail with reference to FIG. 2. The program memory 160 can also include a menu manger 165 and an integrator 182. The menu manager 165 can graphically display a selection list or word choice list including two or more choices to a user and determining a selection by a user of one of said graphically displayed choices according to the disclosed method. The integrator 182 replaces one or more input words based on the selection by the user from the displayed selection list. The memory 150 also includes data memory 170 that includes any configuration data, settings, user options and preferences that may be needed by the program memory 160, or any element of the computing device 102.

In some embodiments, the data memory 170 includes a language database 172 based on the advanced language model. The language database 172 can stores bigrams, or pairs of words (if n=2) with corresponding probabilities for next words. In some embodiments, the data memory 170 can also include a user database 174 based on a dynamic language model. The user database 174 can store words preferred by a user.

In some embodiments, the computing device 102 can also include a communication module (not shown) capable of communicating wirelessly with a base station or access point using a wireless mobile telephone standard, such as the Global System for Mobile Communications (GSM), Long Term Evolution (LTE), IEEE 802.11 (e.g., Wi-Fi), or another wireless standard. The communication device may also communicate with another device or a server through a network using, for example, TCP/IP protocols. For example, computing device 102 may utilize the communication module to offload some processing operations to a more robust system or computer. In other implementations, once the necessary database entries or dictionaries are stored on the device 102, the device may perform all the functions required to suggest back corrections without any reliance on any other computing devices.

The computing device 102 can include a variety of computer-readable media, e.g., a magnetic storage device, flash drive, RAM, ROM, tape drive, disk, CD, or DVD. Computer-readable media can be any available storage media and include both volatile and nonvolatile media and removable and non-removable media.

The correction suggestion system can be implemented in numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

It is to be understood that the logic illustrated in each of the following block diagrams and flow diagrams may be altered in a variety of ways. For example, the order of the logic may be rearranged, sub-steps may be performed in parallel, illustrated logic may be omitted, other logic may be included, etc.

2. Example System

Figure 2:
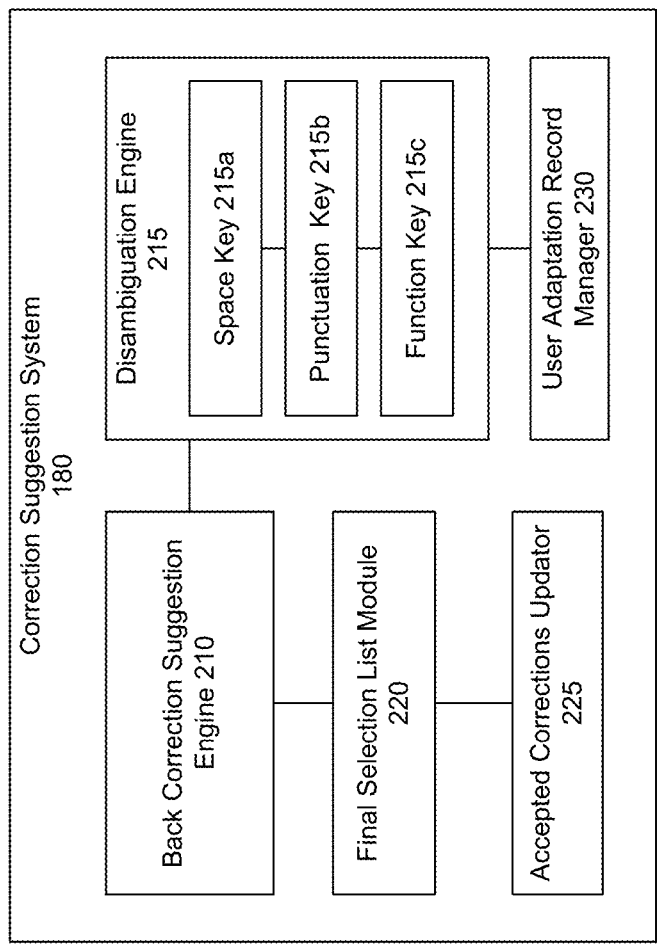
FIG. 2 is a block diagram illustrating example components of the correction suggestion system.

FIG. 2 is a block diagram illustrating example components of the correction suggestion system 180. In some embodiments, the correction suggestion system 180 provides a mechanism for suggesting a different possibility for a word already entered based on the current word (e.g., the right context). In some other embodiments, the correction suggestion system 180 provides a mechanism for disambiguating spaces from letters, or a space transposed with a letter, and handling mishits on function keys such as a backspace or a shift key. The suggested word or words can be provided in a selection list for display by the computing device 102.

In some embodiments, as illustrated, the correction suggestion system 180 can include a back correction suggestion engine 210, a disambiguation engine 215, a final selection list module 220, an accepted corrections updator 225, and a user adaptation record module 230. One or more of these components of the correction suggestion system 180 may be consolidated or divided into sub-components in some other embodiments.

The back correction suggestion engine 210 employs a probabilistic algorithm to identify, based on a language model (e.g., advanced language model and/or dynamic language model), a new previous word that has a higher conditional probability of preceding a current word than a previous word that was received from the user. As described above, the language database 172 stores a word or words that are most likely to succeed an existing sequence of words (n-grams) based on the n-gram language model and can be used to identify candidate words to suggest to the user to expedite text input. For example, when a user inputs the words "the planet" a predictive algorithm can use the language database 174 to determine that there is a 60% likelihood that the user intends to input the word "Earth" and 30% likelihood that the user intends to input the word "Mars" after the words "the planet." In this case, the predictive algorithm can suggest "Earth" and "Mars" as likely candidate words for the user to select. The probabilistic algorithm implemented by the back correction suggestion engine 210 utilizes the same language database 172 that includes probabilities in the forward (left to right) direction to determine, on the fly, a new previous word that is more likely to precede a current word that the user has already entered. The back correction suggestion engine 210 is able to make that determination without having to build a backward or inverse language model containing probabilities of a particular word preceding a current word and without having to somehow generate a backward language database from a forward language database. This reuse of the existing language database 174 enables the correction suggestion system 180 to reduce memory and other resource usage and increase the overall efficiency.

In some embodiments, the probabilistic algorithm employed by the back correction engine 210 utilizes a previous selection list and a current selection list and one or more language models (e.g., n-gram and/or dynamic language models) to find a new previous word that best matches the context of the current word. To find the new previous word that best matches the context of the current word, for each current word in the current selection list, the probabilistic algorithm scores each previous word in the previous selection list based on a likelihood of the previous word preceding the current word. The probabilistic algorithm then identifies a new previous word in the previous selection list that has the best score and compares the score of that new previous word with a score for the original previous word. If the score for the new previous word is better than that of the original previous word by at least some predetermined factor, then the new previous word is provided as a back correction. The process of finding the new previous word is described in detail with reference to FIGS. 3A and 5.

In some embodiments, the final selection list module 220 generates the final selection list for display by the menu manager 165 of the computing device. The final selection list can include a new previous word for back correction, the previous word without back correction (base word), and/or other correction options for the current word. For example, when a user inputs the words "put stop," the final selection list generated by the final selection list module 220 can include an entry "pit stop" for back correction to replace the original previous word "put," the base word without back correction "stop" and other alternatives "sup," and "sip" for the current word "stop."

The user can select any of the entries on the final selection list. When the user accepts the back correction entry, an integrator 182 deletes the original previous word and inserts the new previous word in its place. Once a previous word is replaced with a new previous word through back correction, the system can make various updates. In some embodiments, the system can adjust the history of n-grams used in the dynamic language model (e.g., via the accepted corrections module 225) so that the correct model can be utilized for future prediction and correction. For example, after a user has entered "a pot bull" the system can learn the trigram "a pot bull" and the bi-gram "pot bull." But after "pot" is corrected to "pit," the previously learned trigram and bi-gram no longer reflect what the user entered. So the system changes the learned history to reflect the trigram "a pit bull" and the bi-gram "pit bull." In some embodiments, to enable reselection of a word and show a selection list for that word again, the system can store information on generating the selection list indexed by the final word chosen since the final word chosen will be in the buffer. For example, after a user enters "a pot bull," and the system changes "pot" to "pit" through back correction, the system changes a recapture record associated with "pit" and "pot" so that the recapture record is indexed by "pit." That way, when the user selects the word "pit," the system can find the recapture record and show the selection list for that word because what is in the buffer ("pit") is used to index the record.

In some embodiments, the correction suggestion system 180 can adjust to a user who does not accept back corrections by offering suggestions for back corrections less frequently. The user adaptation record module 230 can store an accept count and an offer count for the user on a user adaptation record. Neither the accept count nor the offer count is incremented unless the user explicitly accepts a word with a correction or the same base word without a correction. For example, for the final selection list "ill will|will|Will|well|we'll|all we'll," the offer count is incremented if the user selects "ill will," "will," "we'll" or "all we'll" as they are all involved in a correction and are not default. The accept count, on the other hand, is incremented if the user selects "ill will" or "all we'll" as these trigger back correction. Neither is incremented if "well" or "Will" is selected because these words did not trigger back correction. In some embodiments, the accept count and the offer count are initialized with a value (e.g., 3 for accept count and 5 for offer count) to provide an initial discount equivalent to the ratio of the accept count to offer count (e.g., 3/5) to the predicted likelihood of a back correction being accepted.

As described above, in some embodiments, a back correction can be provided if the new previous word score exceeds the old previous word score by at least a factor. In some embodiments, that factor is calculated based on the ratio of the accept count and offer count stored in the user adaptation record, if the user adaptation feature is enabled. If the user adaptation feature is disabled, then the factor can be calculated based on the ratio of the initial values of the accept count and offer count. For example, if the new previous word score is greater than the old previous word score by at least a factor of ((offer count/accept count)+1)/2, then the back correction suggestion engine can output the new previous word for back correction. In some embodiments, the back correction entry can be the first entry to be listed in the final selection list if the new previous word score is better than the ratio of offer count to accept count. When the count exceeds a threshold, the count can be renormalized by dividing the numerator and the denominator by two and rounding up so that the numerator will always be above zero. As mentioned above, the offer and accept counts can be stored as part of the user-adaptation record on the computing device 102.

The disambiguation engine 215 can detect user errors in mobile text input including space key, punctuation key and function key related errors by considering such key taps as ambiguous hits or mishits. In some embodiments, the disambiguation engine 215 can correct for space key related errors via the space key module 215a. A correction can be made by the space key module 215a when the module detects tapping of a space key instead of a letter key (e.g., tapping "or it" when the user intended to tap "orbit"), tapping of a space key when no key was intended (e.g., tapping "for bid" when the user intended to tap "forbid") or a space transposition with a letter (e.g., tapping "jump int he" when the user intended to tap "jump in the"). In some embodiments, the space key module 215a can correct an ambiguous space key tap by remembering a sequence in which a word before the current word was tapped, segmenting the tap sequence in multiple ways and scoring the component words or a combined word including the ambiguous space. In some embodiments, it may not be necessary to remember the tap sequence to correct certain space key related tapping errors.

The space key module 215a can recover a key sequence, from one or more previous words to a current word, including any spaces between the words. To correct for a space transposition, the space key module 215a, in some embodiments, can instead use the exact tap sequence. For example, if the exact tap sequence is "int he," the space key module 210b can re-segment the previous word by moving the space one position to the left ("in the") and one position right ("inth e"). The space key module 215a can then calculate a score for the re-segmented previous word. In some embodiments, a score is calculated based on a path score of the exact tap word (e.g., a score indicating how well the exact tap word matches a word in the language model), a ratio of the language model scores of the re-segmented previous word and the existing previous word, language model score of the re-segmented current word, a probability of an uncaught transposition error and/or back correction discount (e.g., based on the offer and accept counts). In this case, the re-segmented word "in" scores better than "inth" and "int" and is therefore selected as a suggestion for back correction. In some embodiments, instead of re-segmenting the full tap sequence multiple different ways, the space key module 215a searches the language database 172 using the exact tap sequence ("int he") to find nearby language database words ("in" and "the").

In some embodiments, the space key module can recognize a better way to segment a previous word, but the previous tap sequence may already have the correct word due to error correction. For example, in tapping "download the softwaref or", the word "softwaref" can be corrected with spell correction to "software," but the space key module 215a can recognize a hanging "f" and insert "for" into the selection list. Thus, the selection list would include "software for." Conversely, in tapping "maste rplan," "master" is the default for the previous word, but the space key module 215a can detect a space transposition error and recognize that "r" may be extra and insert "plan" in the selection list as "master plan." In some instances, a correction may not be suggested when the second word is shifted, when the previous word has a mixed case, etc. For example, for the words "to Ystore," the shifted second word can indicate that the user intended to use the space key, and thus, the space key module 215a does not offer a suggestion "toy store."

The space key module 215a can also correct for a space key that was tapped instead of a nearby key, or an extra space key in some embodiments. The space key module 215a uses the full tap sequence (i.e., the keys for the previous word, the space and the current word) to search the language database 172 for words that are close by. The space key module 215a then scores the words that are close to the tap sequence against a default word in the previous context. For example, if a tap sequence includes "Geosynchronous or it," for the context of "geosynchronous," "geosynchronous orbit" is more common. So, it is likely that the user intended to tap a letter "b" but tapped a space key instead. The space key module 215a can then select "orbit" as a suggestion to replace the previous word and the current word. The candidate word "orbit" is then displayed along with other candidate words "it," "if," "its" and "it's" for the current word "it." In some embodiments, the space key module 215a can provide corrections only when one or more criteria are met. In some instances, a correction may not be suggested when the capitalizations of the first and second words do not match, except when the first word is capitalized and the second word is not, when the previous word has a mixed case, etc. For example, the space key module 215a can suggest a correction for the words "Exa ple" to "Example." However, the space key module 215 may not offer corrections for the words "Exa PLE," "exa Ple," or "EXA ple."

The punctuation key module 215b can correct for a punctuation key press instead of a letter key or a space key press. The module can consider a punctuation key press as a mishit and offer one or more candidates to correct for the mishit. In some cases, the layout of the keyboard can be factored in when identifying the candidates. For example, a period or a comma can be treated as being ambiguous with a space, as the space key is usually next to the period and comma keys in a keypad. In other instances, a punctuation can be treated as being ambiguous with a letter key. Then the punctuation key module can offer one or more candidates matching the key sequence up to the punctuation key and a letter key that may have been intended instead of the punctuation key. For example, if a user taps "ai." then the punctuation key module 215b can consider the comma as being ambiguous with a letter and identify the word "aim" as a candidate based on language model probabilities.

Similar to the punctuation key module 215b, the function key module 215c can correct for errors involving a function key such as shift key or a delete key by considering the function key as being ambiguous with a letter key. For the shift key, there is no word break to deal with, so the function key module 215c can suggest candidates that include the word with the shift and a word with a letter instead of the shift. For example, for a word "gID" ("gl" followed by a tap of the shift key and a letter "d"), the user may have intended to tap the letter "a" but instead tapped the shift key that is close to the letter "a" on the keypad. So, the function key module 215c can identify both "gID" and "glad" as entries in the final selection list.

For the delete key, there is no word break and the function key module 215c considers the delete as being an ambiguous delete. In other words, a user may have intended to tap a letter, but instead tapped the delete key. The function key module 215c then generates a selection list choices with one fewer letter (for the delete) and one more letter (for the letter), intermixed based on the probabilities of each (including how close the tap was to the center of the delete or the letter). For example, for the word "twir" followed by a delete key tap, the user may have intended to tap the letter "I." The selection list for the word with an ambiguous delete can then include "twi," (for the delete), "two" (close to the word "twi" in the language database 172), "twirl" (for the delete being ambiguous with the letter "I" close to the delete key on a keypad), and "twirling" (close to the word "twirl" in the language database 172).

3. Example Processing

Figure 3A:
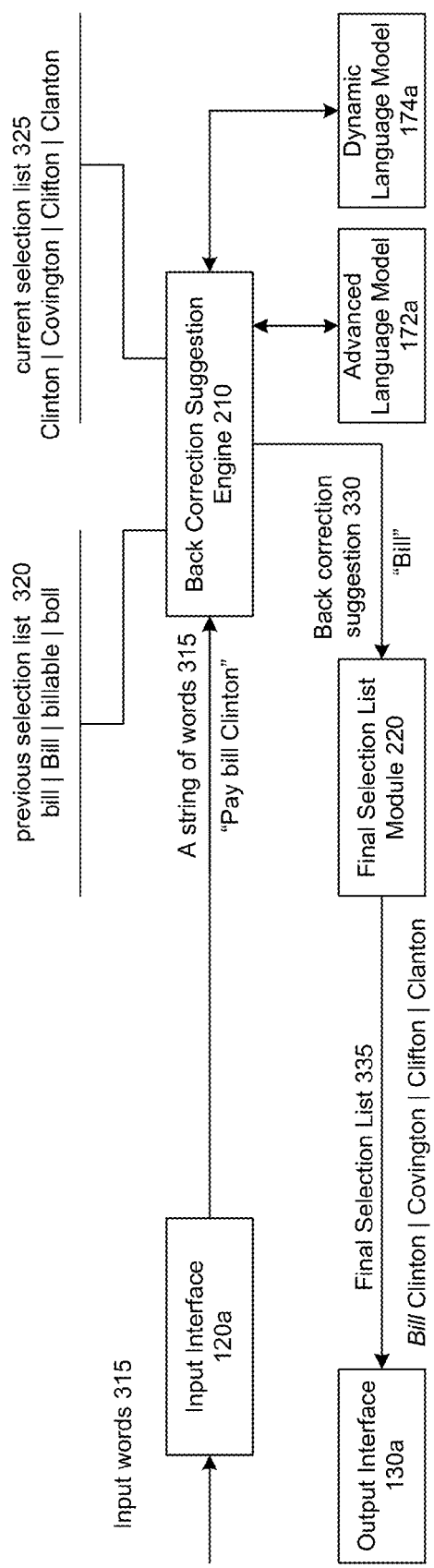
FIG. 3A is a block diagram illustrating generation of a final selection list including a suggested back correction by the correction suggestion system.

As explained above, the back correction suggestion engine 210, when triggered by a current word, identifies a suggestion for a previous word that precedes the current word and provides the suggestion for back correction in a selection list for the current word that is displayed to a user for selection. FIG. 3A is a block diagram illustrating generation of a selection list including the back correction for the previous word.

A user inputs words 315 via an input device 120 associated with a computing device 102. The input words 315 are received by the input interface 120a and provided to the back correction suggestion engine 210. The back correction suggestion engine 210, employing a probabilistic algorithm, determines, based on a current selection list 325, a previous selection list 320 and the advanced language model 172a (and in some instances the dynamic language model 172b) a correction for the previous word for a given current word in the current selection list 325. As used herein, a current selection list includes word choices for the current word and a previous selection list includes word choices for the previous word that precedes the current word.

Figure 3B:
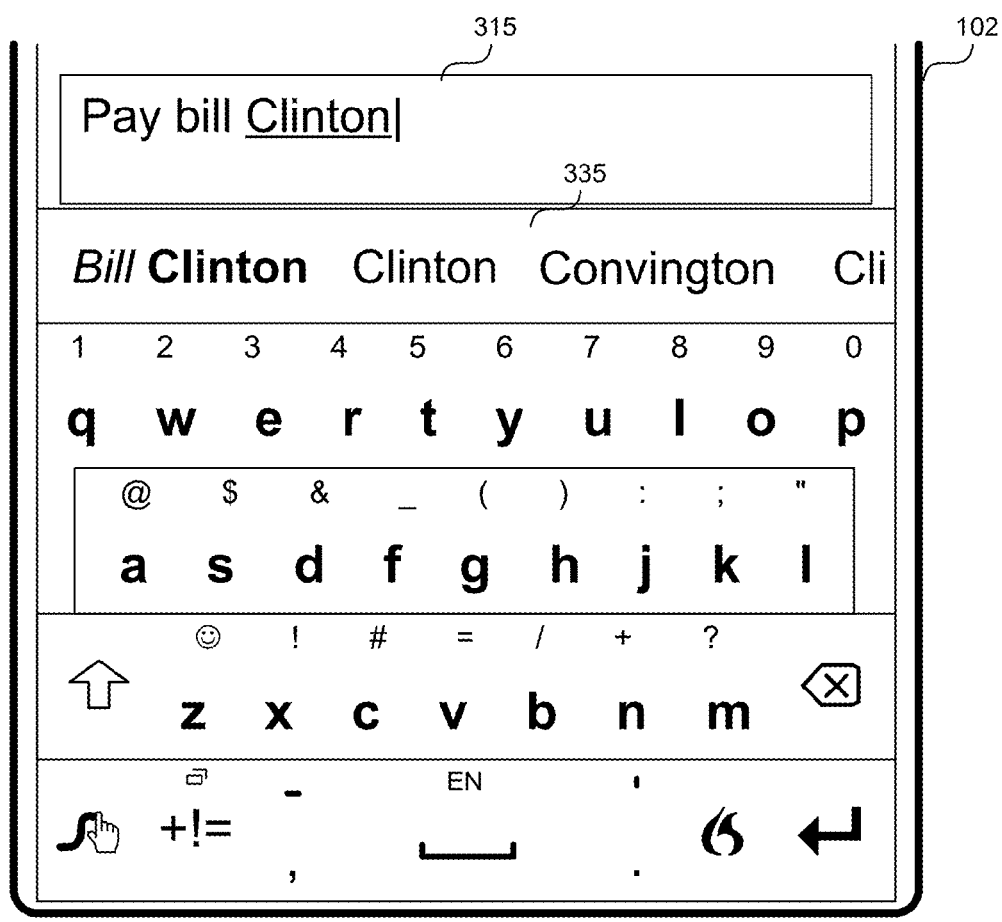
FIG. 3B is a graphical diagram illustrating an example of the final list selection list of FIG. 3A.

For example, as illustrated in the graphical diagram of FIG. 3B, a user may tap the text "Pay bill Clinton" 315 on the computing device 102. The back correction suggestion engine 210 then determines "Bill" as a back correction for "bill" given the current word "Clinton." Consequently, "Bill Clinton" appears as a choice on the selection list 335.

Referring to FIG. 3A, the back correction engine 210 determines "Bill" as a back correction for "bill" by systematically assessing, based on language model probabilities (e.g., from the advanced language model 172a, the dynamic language model 174a) which of the previous word choices better match the current word choices. For example, the previous selection list 320 includes the choices "bill," "Bill," "billable," and "boll," while the current selection list 325 includes the choices "Clinton," "Covington," "Clifton," and "Clanton." For the given current word "Clinton," the word "Bill" is a better choice for the previous word than "bill" and other choices in the previous selection list 320. For the other candidates in the current selection list, there are no better choices. So, the back correction suggestion engine 210 suggests "Bill" as the back correction 330 for the previous word "bill." The final selection list module 220 then generates a final selection list 335 that includes the back correction 330 "Bill Clinton" as a choice among others and provides the final selection list to the output interface 130a for display on the output device 130 of the computing device 102.

As shown in FIG. 3B, the final selection list 335 includes "Bill Clinton," "Clinton," "Covington" and so on as choices for user selection. If the user selects the back correction choice "Bill Clinton" then the previous word "bill" would be replaced by the correction "Bill." The correction "Bill" can be formatted in a specific way to indicate that it is a back correction (e.g., italicized or italicized and greyed out) and can be followed by the triggering word ("Clinton" in this example). The back correction entry or choice need not be the first entry on the final selection list. In some embodiments, the entries can be arranged based on probabilities. For example, the final selection list 335 lists "Bill Clinton" before the other choices as it is more likely to be what the user intended to tap.

A list of examples of traces or taps and corresponding back corrections (in italics) suggested by the correction suggestion system 180 are shown in Table 1 below.

| Input Words | Back Correction |
|---|---|
| with Bill passed | with bill passed |
| put stop | pit stop |
| put of | pot of |
| put bull | pit bull |
| gouse of | house of |
| it's own | its own |
| well meet | we'll meet |
| luals lumpur | Kuala Lumpur |
| if is | he is |

When a current word is entered, the current word is used by the system as a trigger to find back corrections for a previous word preceding the current word. The back corrections, as shown in table 1, can include changing the case of the previous word. For example, for the input words "with Bill passed," the back correction includes changing the uppercase "Bill" to lowercase "bill" based on the right context "passed." By way of another example, for the previous word "put," when "put" is followed by "stop," the back correction includes changing "put" to "pit" to form "pit stop." However, when the same word "put" is followed by "of," the back correction includes a different word "pot" to form "pot of."

Figure 4A:
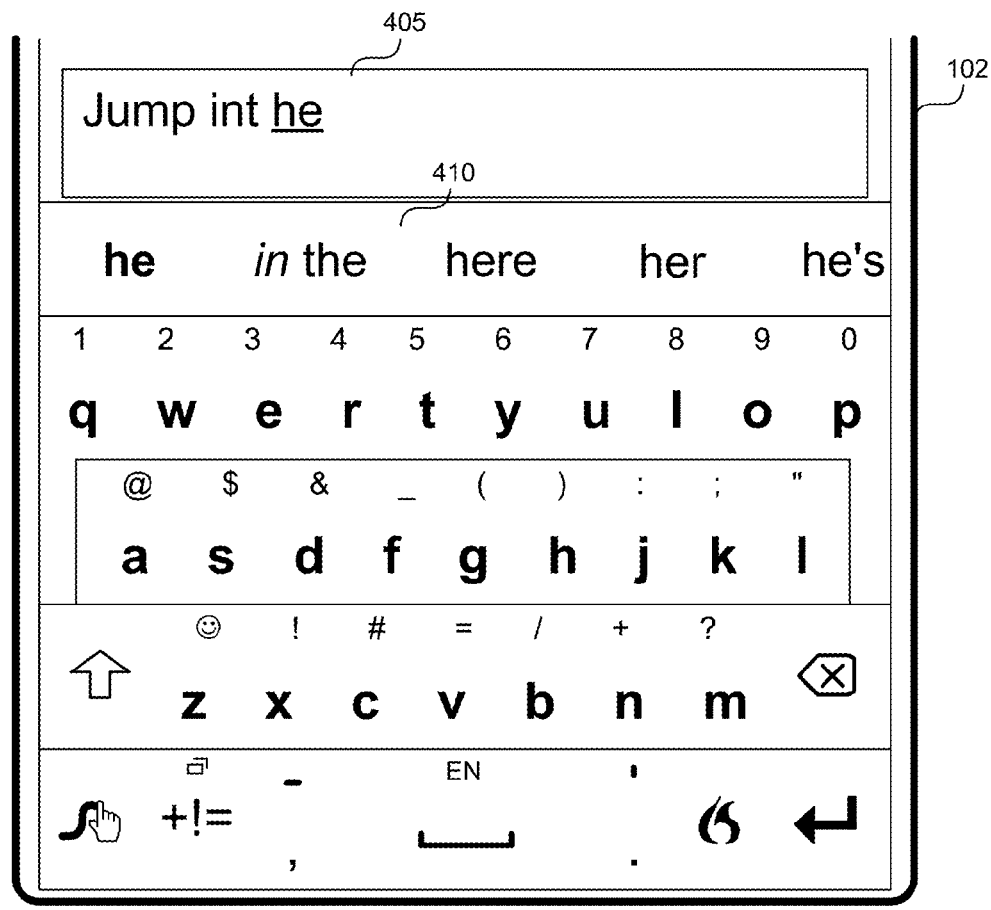
FIG. 4A is a graphical diagram illustrating a suggested back correction for a space transposition error.

FIG. 4A is a graphical diagram illustrating an example of a suggested back correction for a space transposition error. In other words, a user intended to input the words "Jump in the" but instead made a space transposition error that caused the user to input the words "Jump int he" in the input area 405 of the computing device 102. The space key module 215a detects this space transposition error and identifies a suggested back correction for the error. The suggested back correction is then included in the selection list 410 displayed on the user interface. The selection list 410 includes suggested corrections for the current word "he" that includes "he," "here," "her," and "he's," along with a suggested back correction "in the" for the space transposition error.

Figure 4B:
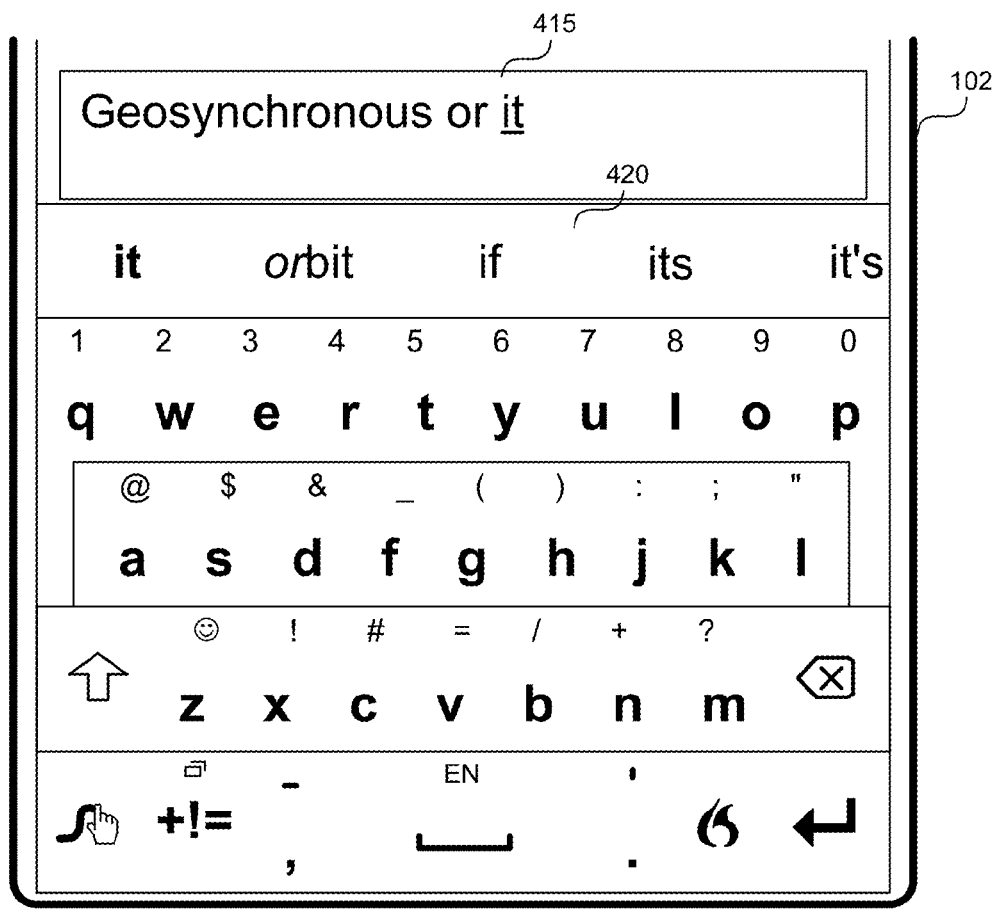
FIG. 4B is a graphical diagram illustrating a suggested back correction for an ambiguous space key tap.

FIG. 4B is a graphical diagram illustrating an example of a suggested back correction for an ambiguous space key tap. In this case, the user may have intended to tap a letter but instead tapped a space that caused the words "Geosynchronous or it" to be entered in the input area 415. The space key module 215a then identifies a back correction "orbit" based on the context "geosynchronous" and words that are close to "or it" in the language database 172 and/or user database 174, and inserts the back correction in the selection list 420, which also includes the suggestions "it," "if," "its" and "it's" for correcting the current word "it."

Figure 4C:
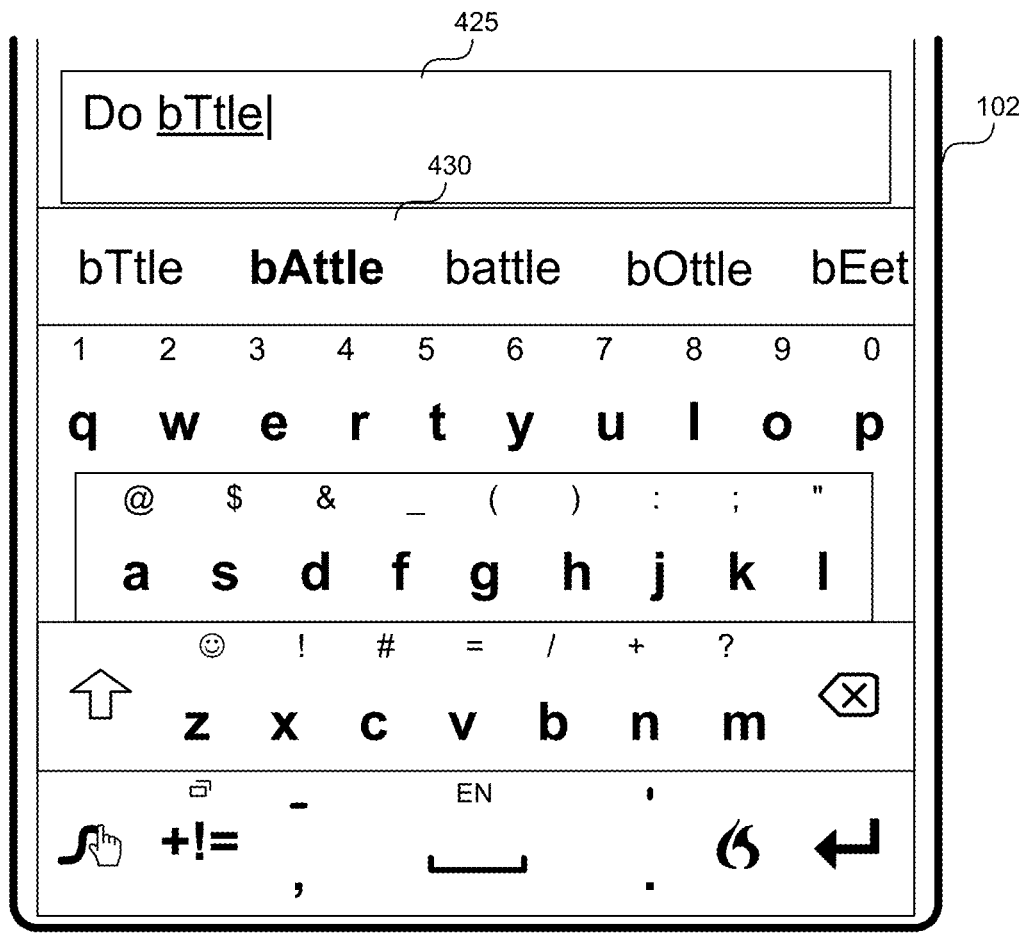
FIG. 4C is a graphical diagram illustrating a suggested back correction for an ambiguous shift key tap.

FIG. 4C is a graphical diagram illustrating an example of a suggested back correction for an ambiguous shift key tap. In the graphical diagram, a user has traced the words "Do bTtle" displayed in the input area 425. The user may not have intended to tap the shift key, but instead the letter "a" that is located close to the shift key on the keypad. The function key module 215c then identifies, from the language database, the word "battle" as a correction based on the tap sequence. The correction word "battle" is then displayed on the selection list 430. The selection list can also include other corrections such as "bTtle," (no correction), "bAttle" (with the shift key tap), "bOttle" and so on.

Figure 4D:
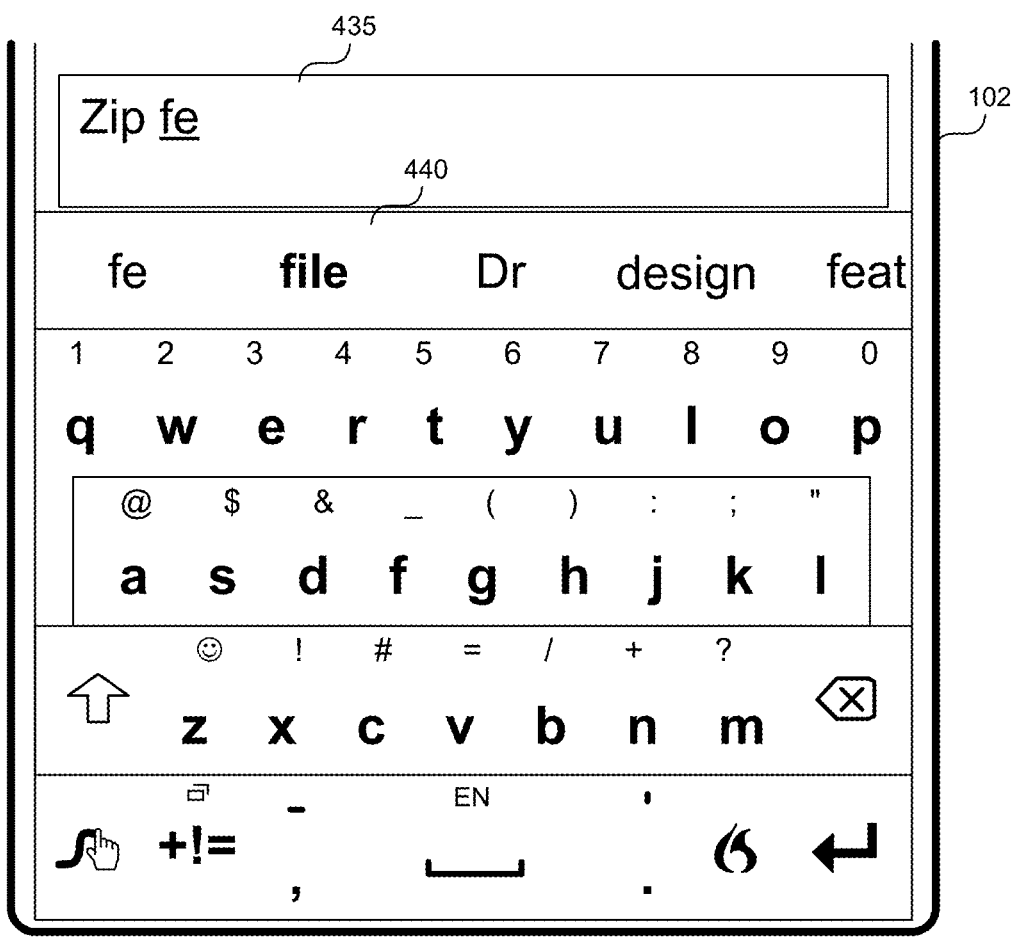
FIG. 4D is a graphical diagram illustrating a suggested correction for an ambiguous delete key tap.

FIG. 4D is a graphical diagram illustrating an example of a suggested correction for an ambiguous delete key tap. In the graphical diagram, a user has tapped the words "Zip fe" shown in the input area 435 with a delete key press after the letter "f" and before the letter "e." Based on this information, the language database 172 and/or user database 174 and the context of the previous word "Zip," a suggested correction "file" is identified. The suggested correction "file" appears along with other candidates for "fe" in the selection list 440. In this case, and in the case of FIG. 4C, the suggestion correction is for the current word, and not a back correction (i.e., correction for the previous word). Consequently, the correction entries in the selection list are not italicized or formatted as a back correction entry would generally be.

Figure 5:
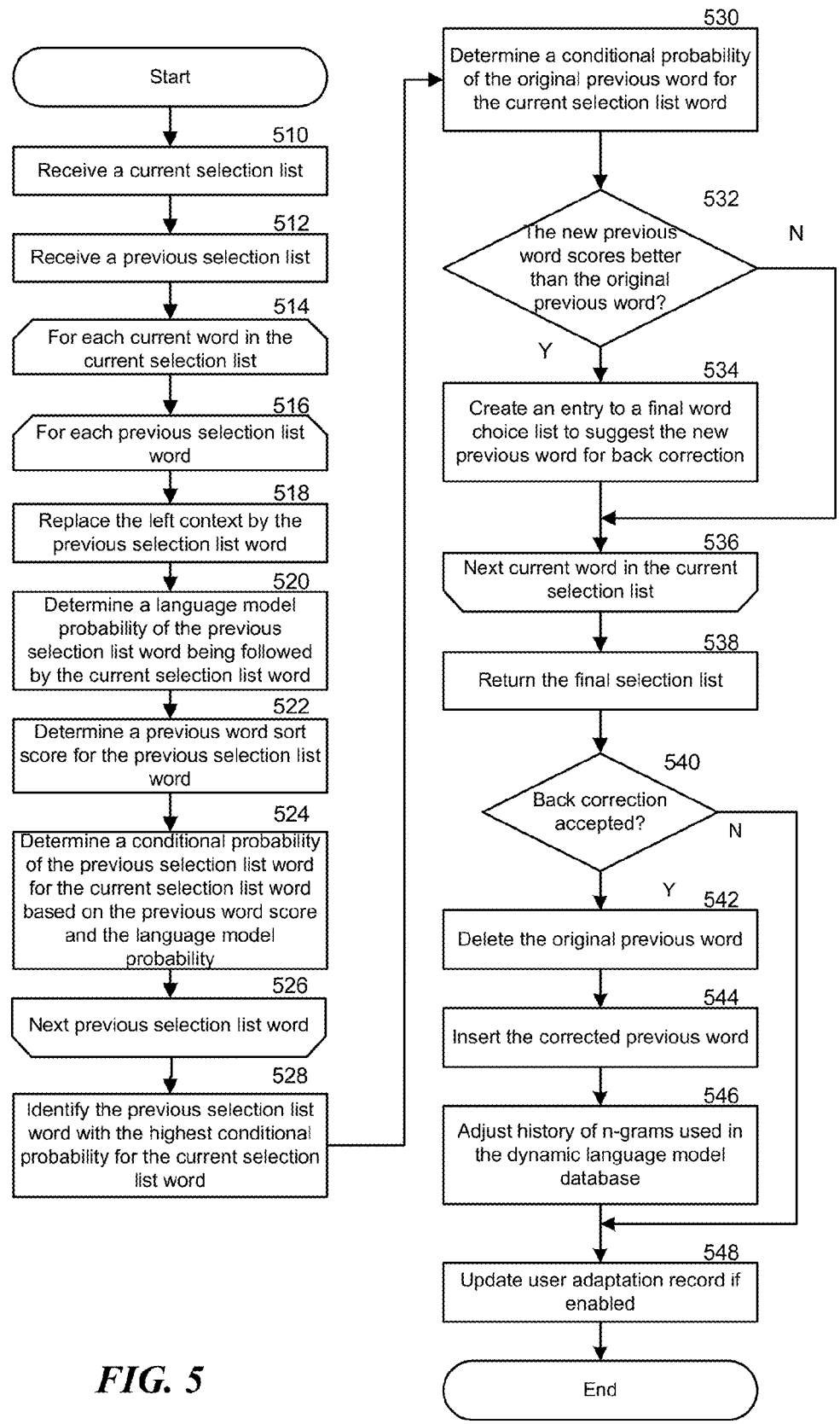
FIG. 5 is a flow diagram illustrating an example method of generating a final selection list including a suggested back correction.

FIG. 5 is a flow diagram illustrating an example method of generating a final selection list including a suggested back correction. When the method starts, for a given current word preceding a previous word or words, the back correction suggestion engine 210 generates, receives or obtains a current selection list at block 510. The current selection list includes word choices that can be selected by a user to replace the original current word. At block 512, the back correction suggestion engine 210 generates, receives or otherwise obtains a previous selection list that includes word choices for the original previous word, before the current word was input. For each current selection list word at block 514, and for each previous selection list word at block 516, the back correction suggestion engine 210 finds the best previous selection list word that is the most likely choice for replacing the original previous word.

To find the best word in the previous selection list, the back correction suggestion engine 210 scores each previous selection list word based on a conditional probability of that word for the current selection list word. The scoring process includes taking each previous selection list word and replacing the left context of the current selection list word by that word at block 518, obtaining or determining a language model score (e.g., advanced language model, dynamic language model or both) for the current selection list word at block 520 and determining or receiving a previous word sort score for the previous selection list word at block 522. The language model score provides a probability of the previous selection list word being followed by the current selection list word. The previous word sort score is the total score for the word on which the previous selection list was sorted. In some embodiments, it is a product of the path score for the word and the language model score. The scoring process further includes calculating or determining a conditional probability of the previous selection list word for the current selection list word based on the previous word sort score and the language model probability at block 524. In some embodiments, a conditional probability is calculated using equation (1) below:

Conditional Probability ($P_c$)=Previous Word Sort Score*Language Model Score for the Current Selection List Word At block 526, the next previous selection word is selected as a trial previous word and the acts of blocks 518-524 are repeated with the trial previous word. At block 528, the back correction suggestion engine 210 identifies a previous selection list word that has the highest conditional probability of preceding the current selection list word as a new previous word. At block 530, the back correction suggestion engine 210 scores the original previous word based on a conditional probability of the original previous word for the current selection list word. To do so, the back correction suggestion engine 210 replaces the left context of the current selection list word with the word currently in the buffer (i.e., return the left context to as it was originally) and calculates the product of its previous word sort score and the language model probability of being followed by the current selection list word. At decision block 532, if the new previous word has a better score (e.g., conditional probability) than the original or old previous word, the back correction suggestion engine 210 (e.g., via the final selection list module 220) modifies the current selection list to create a back correction entry suggesting the new previous word at block 534.

In some embodiments, at decision block 532, the back correction suggestion engine 210 determines if the new previous word score is better than the old previous word score by a factor. The factor can be determined using information from the user adaptation record, when the user adaptation feature is enabled. The user adaptation record provides an indication of how often a user has accepted corrections in the past, and is used to discount the chance of giving a correction to the user if the user does not usually accept corrections. When the user adaptation feature is disabled, the factor is determined using initial values of the offer count and accept count.

If the new previous word does not have a better score than the old previous word at decision block 530, then the back correction suggestion engine 210 does not create an additional entry in the final selection list, and instead tries the next word in the current selection list at block 536. At block 536, the back correction suggestion engine 210 repeats the acts of blocks 514-536 using the next word in the current selection list. At block 538, the back correction suggestion engine 210 returns the final selection list. In some embodiments, the word without the back correction (the base word) can still be in the final selection list. The new previous word can be inserted in the final selection list before the base word when one or more criteria are met. Some examples of the criteria are the following.

(1) The new previous word score is better than a factor, which can be calculated as a ratio of offer count to accept count in some embodiments. The initial values of accept and offer counts can be used when the user adaptation is disabled, otherwise, the accept and offer counts retrieved from the user adaptation record can be used to calculate this factor.

(2) The old previous word was tapped (i.e., it is not a prediction) and the general correction mode is enabled.

(3) The original right context word is not an exact tap.

If one or more of the criteria above are not satisfied, then the new previous word is inserted after the base word.

The user can select an entry from the final selection list that is displayed on a computing device. In some cases, the user may not select any entry from the final selection list. At decision block 540, if the back correction suggestion engine 210 detects that a back correction has been accepted, the integrator 182 deletes the old previous word at block 542 and then inserts the new previous word from the back correction entry that was selected at block 544, thereby replacing the old previous word with the new previous word. In some embodiments, at block 546, the accepted corrections updator 225 adjusts the history of n-grams used in the user database 174 and then updates the user adaptation record at block 548, if the user adaptation feature is enabled. If no back correction is accepted by the user, the accepted corrections updator 225 still updates the user adaptation record at block 548, if enabled.

To illustrate the method described above, suppose a user traces a string of words "I know it's name." Before "name" is entered, the (previous) selection list includes the words "it's," "its," "outs," "it" and "is." As "it's" is preferred over "its," the previous selection list lists "it's" before "its." After "name" is entered, the algorithm implemented by the back correction suggestion engine 210 goes through a current selection list that includes the words "name," "named," "names" and "mane" to find the best previous selection list word for back correction. For "name," the algorithm looks at the score for "I know its name" (which matches the context and the path), "I know outs name" (e.g., does not match the path or the context), "I know it name," and "I know is name." The algorithm decides that "I know its name" is the best candidate. Then it returns the context to "it's" and scores "I know it's name." There is a bi-gram for "it's name" in the n-gram language model 172a, but still "name" after "it's" is much less likely than "name" after "its." So, the algorithm adds "its name" as a correction entry to a final selection list ahead of "name" without a correction. The algorithm then repeats the process for the next current selection list word "named." In this example, for "named," the context prefers the existing "it's," for "names" there is no bi-gram for "its names," and so on, so the algorithm does not find any other suggestions. The final selection list then includes "its name|name|names|mane" suggesting back correction of "it's name" to "its name." When the user selects the back correction entry, the algorithm replaces "it's" with "its."

Figure 6:
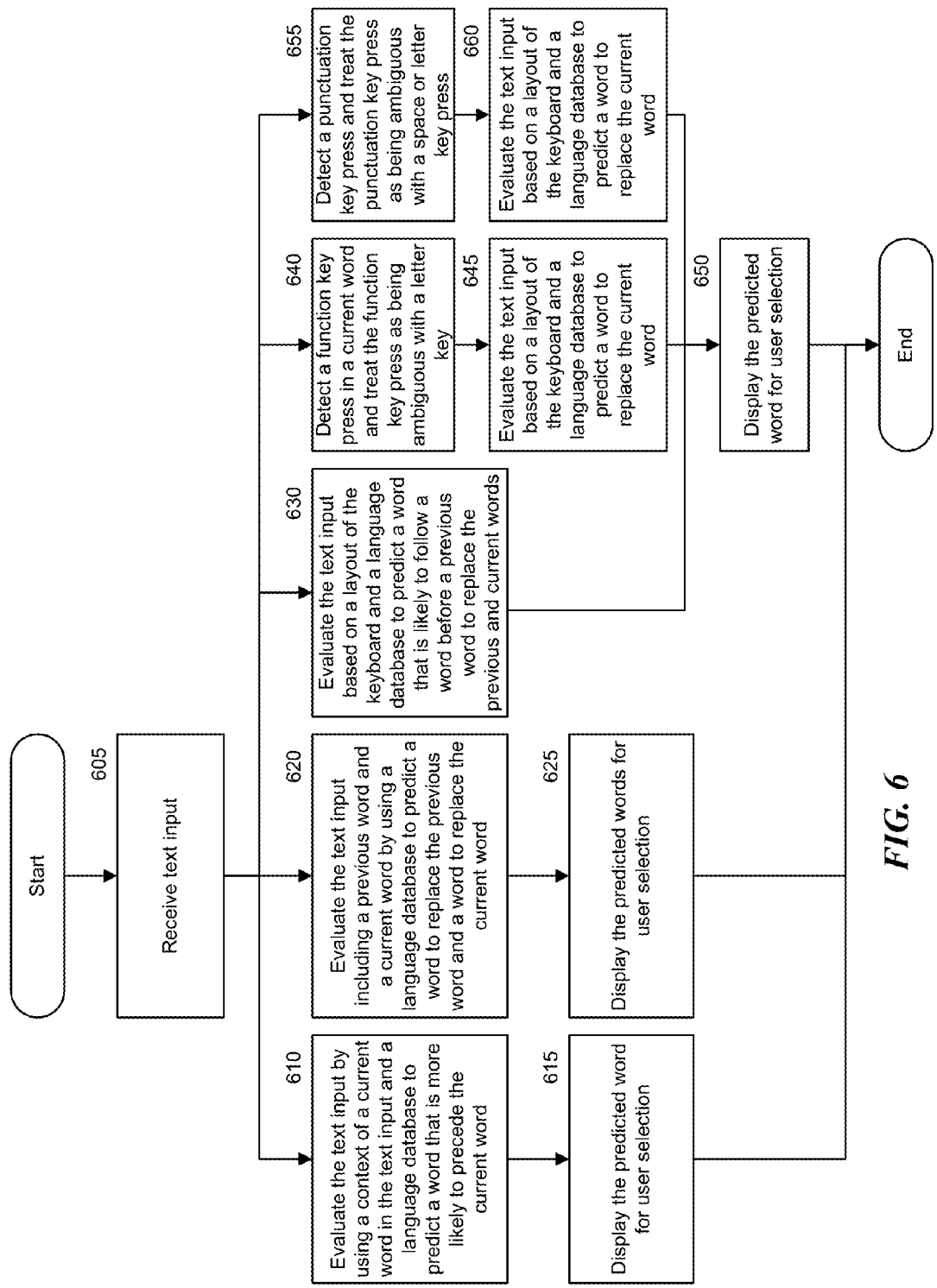
FIG. 6 is a flow diagram illustrating an example method of generating a suggested correction for a previous word, a current word or both.

FIG. 6 is a flow diagram illustrating an example method of generating a suggested correction for a previous word, a current word or both. The example method starts with the correction suggestion system 180 receiving as a text input at block 605. The text input may comprise one or more words, and may include a space key press, a tab key press, an enter key press, a punctuation key press, a function key press (e.g., delete key, shift key). As described throughout this disclosure, the previous word precedes the current word. At block 610, the correction suggestion system 180 can evaluate the text input that comprises at least a previous word and a current word using a language database to predict a word that is more likely to precede the current word than the previous word through back correction. At block 615, the correction suggestion system 180 can display the predicted word for user selection. The predicted word can be displayed together with the current word as a single selectable option or entry. Selection of the predicted word causes a replacement of the previous word with the predicted word through back correction.

In some embodiments, at block 620, the correction suggestion system 180 can evaluate the text input comprising a previous word and a current word using a language database to predict a new previous word and a new current word that the language database indicates are more likely. In some embodiments, the evaluation can include re-segmenting the previous and current words different ways by moving the space one position to the left and one position to the right and utilizing the language database to predict the new previous and current words. The two words are predicted when there is a space transposition error. At block 625, the correction suggestion system 180 displays the predicted words for user selection. Selection of the predicted words causes replacement of the previous word with the new previous word via back correction, and a replacement of the current word with the new current word.

In some embodiments, the correction suggestion system 180 can evaluate the text input comprising a current word, a previous word, and another word preceding the previous word based on a layout of a keyboard or keypad and a language database to predict a word that is likely to follow the previous word to replace the previous and current words. In evaluating the text input, the correction suggestion system 180 considers a space key press (or a tab key press or enter key press) as being ambiguous with a letter key press. Using the knowledge of the layout of the keyboard, the correction suggestion system 180 can determine candidate letters that the user may have intended to press instead of the space key. Based on those candidate letters together with the context of the word preceding the previous word, the correction suggestion system can utilize the language database to predict the word that the user intended to input instead of the previous and current words. At block 655, the correction suggestion system 180 can display the predicted word for user selection. Upon selection of the predicted word, the text input is updated by replacing the previous and current word with the predicted word.

In some embodiments, at block 640, the correction suggestion system 180 can detect a function key press in a current word in the text input and treat the function key press as being ambiguous with a letter key press. At block 645, the correction suggestion system 180 can evaluate the text input based on a layout of the keyboard and a language database to predict a word that is likely to be the word that the user intended to input to replace the current word. Based on the knowledge of the layout of the keyboard, the correction suggestion system 180 can determine candidate letters that the user may have intended to press instead of the function key. For example, for the shift key press, the candidate letters can be letters "a," "s" or "z" corresponding to keys nearby the shift key in some keyboard layouts. Based on the candidate letters, and the language database, the correction suggestion system 180 can predict the word that user intended to input instead of the current word.

In some embodiments, the correction suggestion system 180 can detect a punctuation key press and treat the punctuation key press as being ambiguous with a space key or a letter key press at block 655. The correction suggestion system 180 can evaluate the text input based on a layout of the keyboard and a language database to predict a word to replace the current word at block 660. The correction suggestion system 180 can, based on the layout of the keyboard, determine one or more candidates for the ambiguous punctuation key press. The candidates can be a space key or a letter key neighboring the punctuation key. At block 650, the correction suggestion system 180 can display the predicted word for user selection. The user selection of the predicted word causes the current word to be replaced with the predicted word.

In some embodiments, the correction suggestion system 180 can generate a suggested correction that includes the suggested word for the previous word and the current word when there is an ambiguous space between the previous word and the current word. The ambiguous space can be identified by recording a tap sequence in which the previous word and the current word, including the ambiguous space were input by the user and identifying, based on the probabilities in the language model, a layout of a keypad on the computing device and a context of a word preceding the previous word, the suggested word formed from a combination of the previous word and the current word. In some embodiments, the suggested correction includes the suggested word for the current word. The new current word can be identified when there is a function key tap or a punctuation key (e.g., comma, period) tap.

4. Conclusion

The above Detailed Description of examples of the disclosed system and methods is not intended to be exhaustive or to limit the embodiments to the precise form disclosed above. While specific examples for the embodiments of the disclosed system and methods are described above for illustrative purposes, various equivalent modifications are possible within the scope of the embodiments, as those skilled in the relevant art will recognize.

We claim:
1. A computing device comprising:
a memory; and
a processor disposed to have access to the memory and configured to execute instructions stored in the memory to:
receive multiple words input by a user via a displayed keyboard of the computing device, the multiple words including a current word and a previous word preceding the current word;
identify, based on probabilities in a language model for predicting a next word that is likely to follow one or more prior words, a suggested correction to a space transposition error that includes at least one suggested word to replace the previous word, the current word or both, by:
segmenting a tap sequence including the previous word, a space and the current word multiple ways to generate candidates for the previous word and the current word; and scoring the candidates using the probabilities in the language model to identify candidates for the previous word and the current word that are likely to be words the user intended to input,
wherein the space transposition error is based on the user tapping a displayed space key of the displayed keyboard during input of the tap sequence; and
display the suggested correction for user selection via a user interface of the computing device.

2. The computing device of claim 1, wherein the at least one suggested word to replace the previous word has a higher likelihood of preceding the current word than the previous word based on the probabilities in the language model.

3. The computing device of claim 1, further configured to identify the suggested correction for the space transposition error by:
searching a language database based on the language model using the tap sequence and the previous word and the current word to identify the suggested words.

4. The computing device of claim 1, wherein the suggested correction that includes the suggested word for the previous word and the current word is identified when there is an ambiguous space between the previous word and the current word.

5. The computing device of claim 4, further configured to identify the suggested correction for the ambiguous space by:
recording a tap sequence in which the previous word and the current word, including the ambiguous space were input by the user; and
identifying, based on the probabilities in the language model, knowledge of a layout of a keypad on the computing device and a context of a word preceding the previous word, the suggested word formed from a combination of the previous word and the current word.

6. The computing device of claim 1, wherein the suggested correction that includes the suggested word for the current word is identified when there is a function key tap or a punctuation key tap.

7. A method, comprising:
receiving multiple words input by a user via a keyboard displayed by an input interface of a computing device, the multiple words including a current word and a previous word preceding the current word;
identifying, based on probabilities in a language model for predicting a next word that is likely to follow one or more prior words, a suggested correction to a space transposition error that includes at least one suggested word to replace the previous word, the current word or both, by:
segmenting a tap sequence including the previous word, a space and the current word multiple ways to generate candidates for the previous word and the current word; and
scoring the candidates using the probabilities in the language model to identify candidates for the previous word and the current word that are likely to be words the user intended to input,
wherein the space transposition error is based on the user tapping a displayed space key of the displayed keyboard during input of the tap sequence; and
displaying the suggested correction for user selection via a user interface of the computing device.

8. The method of claim 7, wherein the at least one suggested word to replace the previous word has a higher likelihood of preceding the current word than the previous word based on the probabilities in the language model.

9. The method of claim 7, wherein identifying the suggested correction to the space transposition error includes searching a language database based on the language model using the tap sequence and the previous word and the current word to identify the suggested words.

10. The method of claim 7, wherein the language model includes a probability of a previous word or words being followed by a current word.

11. The method of claim 7, further comprising:
receiving a user selection of the suggested correction via the input interface of the computing device; and
in response, replacing the previous word or the current word with the suggested correction.

12. The method of claim 7, wherein the space transposition error is determined by a space key module that detects an ambiguous space key tap during input of the multiple words by the user.

13. A non-transitory computer-readable medium whose contents, when executed by a computing device, cause the computing device to perform a method, the method comprising:
receiving multiple words input by a user via a keyboard displayed by an input interface of a computing device, the multiple words including a current word and a previous word preceding the current word;
identifying, based on probabilities in a language model for predicting a next word that is likely to follow one or more prior words, a suggested correction to a space transposition error that includes at least one suggested word to replace the previous word, the current word or both, by:
segmenting a tap sequence including the previous word, a space and the current word multiple ways to generate candidates for the previous word and the current word; and
scoring the candidates using the probabilities in the language model to identify candidates for the previous word and the current word that are likely to be words the user intended to input,
wherein the space transposition error is based on the user tapping a displayed space key of the displayed keyboard during input of the tap sequence; and
displaying the suggested correction for user selection via a user interface of the computing device.

14. The non-transitory computer-readable medium of claim 13, wherein the at least one suggested word to replace the previous word has a higher likelihood of preceding the current word than the previous word based on the probabilities in the language model.

15. The non-transitory computer-readable medium of claim 13, wherein identifying the suggested correction to the space transposition error includes searching a language database based on the language model using the tap sequence and the previous word and the current word to identify the suggested words.

16. The non-transitory computer-readable medium of claim 13, wherein the language model includes a probability of a previous word or words being followed by a current word.

17. The non-transitory computer-readable medium of claim 13, further comprising:
receiving a user selection of the suggested correction via the input interface of the computing device; and
in response, replacing the previous word or the current word with the suggested correction.

18. The non-transitory computer-readable medium of claim 13, wherein the space transposition error is determined by a space key module that detects an ambiguous space key tap during input of the multiple words by the user.

\* \* \* \* \*